Sept. 1, 1936.  E. A. OCON  2,052,721
PROCESS FOR CONVERTING HIGH BOILING POINT HYDROCARBONS
INTO LOW BOILING POINT PRODUCTS
Filed Aug. 3, 1935  2 Sheets-Sheet 1

*Fig. 1.*

INVENTOR.
Ernest A. Ocon
BY
ATTORNEY.

Patented Sept. 1, 1936

2,052,721

UNITED STATES PATENT OFFICE 2,052,721

PROCESS FOR CONVERTING HIGH BOIL-
ING POINT HYDROCARBONS INTO LOW
BOILING POINT PRODUCTS

Ernest A. Ocon, New York, N. Y.

Application August 3, 1935, Serial No. 34,563

15 Claims. (Cl. 196—49)

This invention relates to a novel method and apparatus for treating a liquid hydrocarbon charging stock to form therefrom two continuous purified clean streams, each of different characteristics, i. e., one consisting predominantly of hydrocarbons of relatively low molecular weight and the second predominantly of higher molecular weight, for cracking within two separately controlled zones and subsequent common fractionation and condensation.

In one phase of my method, a charging stock, for example of topped crude oil type, is initially heated, then raised in temperature and substantially vaporized, predominantly by the action of highly heated hydrocarbon vapors, preferably cracked oil-steam vapors, and the charging stock during or after its vaporization is subjected jointly with the cracked vapors to the action of desulfurizing materials. The purified charging stock vapors of lower molecular weight that are liberated at a temperature below the cracking temperature are blended with purified oil vapors of generally still lower molecular weight of the cracked oil-steam mixture, a substantial part of the lighter vapors of said blend separate and are condensed and the condensate free of any impurities such as hydrogen sulfide gas is in part used as a cooling medium to condense the vapors of the blend of higher molecular weight and in part used as a temperature controlling medium for the blended cracked vapors of the two charging streams that pass through the fractionating tower as will hereafter be explained. The condensed vapors of higher molecular weight are mixed with purified heavy condensate fractions from the fractionating tower, to form a purified clean charging stock stream led to a cracking zone.

The heavy fractions of the treated charging stock, being non-volatile at the operating temperature, with any entrained condensate, form a second purified clean charging stock stream led to a separately controlled cracking zone. The vapors and entrained liquid from both charging stock streams after leaving the cracking zones are blended, subjected if desired to additional purification, and then lowered in temperature by mixing with a portion of either of the two streams of charging stock as hereinafter will be explained. The blended vapors of the two separately controlled cracking zones are separated from the unvaporizing oil and any tarry or solid material and are passed to the fractionating tower. In their passage they are subjected to gum adsorbent material, e. g. silica gel, diatomaceous earth, bleaching earth, activated charcoal, clay, lime and the like, preferably admixed with other materials, i. e., solid metal catalysts of the desulfurizing type e. g. oxides and/or sulfides of tungsten, molybdenum and iron, or their compounds.

In brief, the hydrocarbon charging stock vapors of relatively low molecular weight are mixed with vapors of still lower molecular weight of the cracked oil-steam mixture, then the blended vapors are condensed in two separate groups of varying molecular weights and the condensate consisting predominantly of higher molecular weight, free of any gas formed including hydrogen sulfide gas, blended with the condensed heavier fraction of the fractionating tower of gas oil nature, forms one of the streams of charging stock led to the cracking zone. The unvaporized heavier fraction of the oil forms the second stream of charging stock led to a second cracking zone, separately controlled, and discharges into the cracked vapors of the first zone to secure the desired blend.

Steam may be admixed with one or both of the oil streams prior or during cracking and preferably the greater portion of steam being admixed with the oil fraction subjected to cracking reaction under the highest temperature. The blended vapors after being separated from the condensed residues (fuel oil) are subjected to fractionation and condensation.

Hydrogen or hydrogenous gases may be injected into either of the two streams of charging stock or into the selected cracking zone itself. In such case said zone will be subjected to a higher pressure sufficient to maintain the stream of oil almost entirely in liquid phase between 25 to 100 atmospheres, to obtain a highly saturated product for blending with a largely unsaturated product produced in the other cracking zone in which the pressure used will be substantially below 25 atmospheres and higher cracking temperature.

If hydrogenous gas is not used in the process, the operating factors of each cracking zone, such as heat, proportion of steam to oil, if used, temperature of steam, speed of vapors, i. e., time of reactions, pressure, etc., may be similar or may be substantially varied from that used in the other zone to secure the desired products from which to obtain by blending, products of predetermined characteristics, the maximum pressure not to exceed 25 atmospheres.

In other words, hydrogen or hydrogenous gas may be injected into either one of the charging stock streams as a substitute for the steam or injected into either one jointly with the steam to produce a highly saturated and largely unsaturated product. The steam simultaneously retards polymerization of the hydrocarbon vapors to avoid carbon formation.

The process will be described by reference to the accompanying drawings in which—

Fig. 1 is a schematic form of apparatus suitable for carrying the process into effect.

Figure 2:
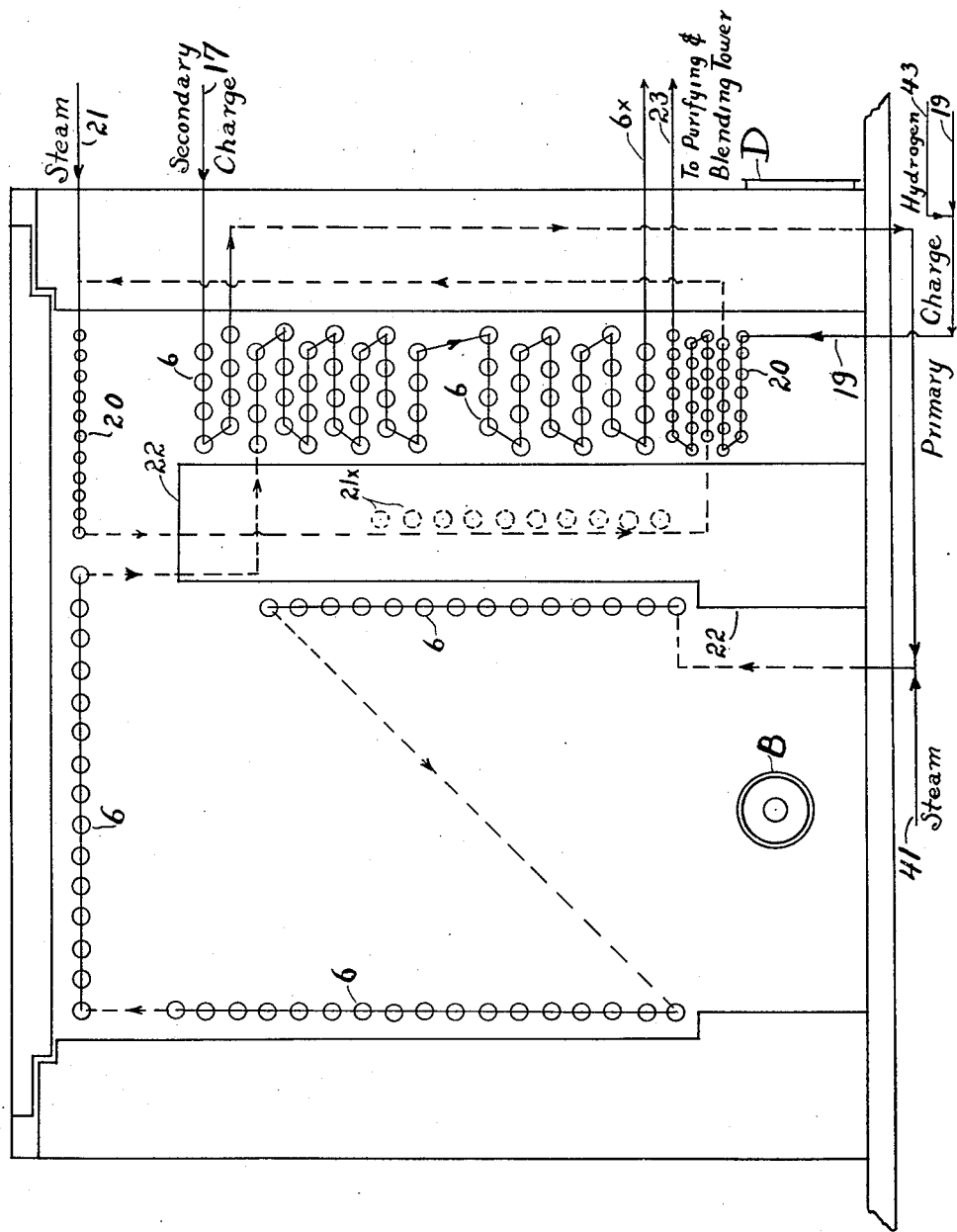
Fig. 2 is an enlarged drawing of the furnace showing the flow through the coil sections within the furnace.

In Fig. 1 the charging stock from any suitable source flowing through pipe 1 is passed through heat exchanger 2 where it is preheated by means of the overhead vapors leaving the fractionating tower 3, is further preheated in heat exchanger 4 and enters the vaporizing and primary desulfurizing tower 5 where it is split into its component fractions. The light fractions are distilled out of the heavier, predominantly by means of the sensible heat in a portion of oil-steam cracked vapors from the cracking furnace coil 6 receiving the higher heat introduced into the bottom of the primary desulfurizing tower 5 by pipe 7 and sprayer 8. The lighter fractions of the charging stock are mixed with the still lighter fractions of the cracked oil-steam vapors in the lower part of the tower 5, and the mixture is subjected to the action of one or more desulfurizing agents from zone 44, e. g., lead, ethylenediamine, $C_2H_4(NH_2)_2$, ammonia, $NH_3$, ammonium sulfide, ammonium chloride, preferably in a solution with material such as water, alcohol, kerosene, oil and the like. Solutions of alkaline or caustic reagents may also be used advantageously, e. g. calcium hydroxide, sodium hydroxide, potassium hydroxide and the like. Part of said sulfur treated light fractions, preferably after passing through adsorbent material 9 are allowed to leave overhead through pipe 10, condensed in condenser 11, separated from any impurities such as hydrogen sulfide gas, allowed to leave from separating tank 11x through pipe 12 and in part refluxed through pipe 13 into the tower 5 as a cooling medium to condense the fractions of higher molecular weight of the blend. The condensed fractions are drawn off from a total draw-off pan 14, disposed within the tower 5, and passed under control of automatic level valve 15 through pipe 16 into the lower part of the bubble tower 3, where they are blended with heavy purified condensed fractions of a gas oil nature and form a purified clean continuous stream which is led through pipe 17 by means of pump 18 into the cracking furnace coil 6, receiving the higher heat. If desired tower 5 may have disposed within two or more draw off pans similar to pan 14.

The heavy fractions of the charging stock, being non-volatile at the operating temperature of between 400° and 700° F., more or less, is withdrawn from the lower part of the primary desulfurizing tower 5 through pipe 19 together with any material of similar nature which may be present in the oil-stream vapors from the cracking coil 6. This mixture is pumped through pipe 19 directly through the primary or mild cracking furnace coil 20 and heated to a temperature of approximately 800° to 900° F., preferably in the presence of steam injected through pipe 21.

Leaving coil 20 the products formed are passed through pipe 23 under expansion into a purifying and blending chamber 24 where they are blended with the products from the higher heated furnace coil 6. Provision is made in chamber 24 for the introduction of sulfur reagent and sulfur absorbent materials, e. g., alkaline hypochlorite, nitric acid, anhydrous aluminum chloride, ethylenediamine, $C_2H_4(NH_2)_2$, ammonia, $NH_3$, and the like through pipes 25 and 25x for further purification of the products if desired. Chamber 24 discharges into the vapor-separating tower 26 into which a reflux of purified blended condensate is also passed through pipe 27 to control the temperature of the vapors. The fuel oil condensate may be withdrawn to storage through pipe 28 and cooler 29.

To remove any injurious constituents, the cracked vapors preferably are passed through adsorbent material 30, as previously mentioned and which may be similarly employed in the primary desulfurizing tower 5, preferably admixed or bound with one or a compound of catalytic materials such as oxides and/or sulfides of vanadium, tantalum, chromium, nickel, titanium, zinc, uranium, lead, iron, tin, alone or admixed with other elements such as silver, magnesium oxide and the like, the bound material employed in tower 26 being in any suitable form such as beads, lumps, briquettes, blocks and the like, then pass overhead through pipe 31 and enter the fractionating tower 3 wherein the vapors are fractionated in passing through bubble decks 3x in contact with sulfur treated liquid reflux supplied through pipe 32 from tank 11x and with part of blended purified condensates supplied through pipe 33 from the stream of charging stock led to the cracking coil 6. The light vapors pass overhead through pipe 34, heat exchanger 2, condenser 35 and discharge into separating tank 36, in which the gasoline is subsequently separated from the fixed gas and any condensed steam, and run to storage through pipe 37 and partly refluxed back into the upper part of the fractionating tower through reflux pipe 38. The gas passes off through pipe 39 into an absorption tower (not shown) and the water is drawn off through pipe 40.

The heavier material of a gas oil nature condensed and accumulated in the bottom of the fractionating tower, blended with the light fractions of the charging stock allowed to run from the primary desulfurizing tower through pipe 16, forms the stream charge passed through pipe 17 by means of pump 18 into the cracking furnace coil 6. This stream is processed at a much higher cracking rate due to the elevated temperature used, than is the case of the primary or mild cracking operation in coil 20, the temperature being from approximately 1000° to 1200° F. Steam in greater proportion than in the coil 20 may also be passed into coil 6 through pipe 41 to retard polymerization, decreasing coking difficulties.

Part of the products formed in coil 6 are blended with the products from the primary or mild cracking coil 20 as previously described, and the blend is reduced in temperature by mixing it with a portion of the stream charge passed into the coil 6 and led to the blending tank 24 through pipes 42 and 42x by means of pump 18. Before the release of pressure in the purifying and blending chamber 24 a portion of the vapors, preferably from the higher heated cracking coil 6, are diverted through pipe 7 to the bottom of the primary desulfurizing tower 5 as heating medium as hereinbefore described.

Hydrogen may be passed with the charging stock into the cracking zone 20 receiving the lower heat, through pipe 43 as a substitute for the steam or with the steam.

If hydrogen is passed into the cracking coil 20 catalysts of the hydrogenation type such as chromium-nickel-iron alloy will be used, the catalyst may be used with a carrier passed through said coil or may be a fixed catalyst disposed preferably at the outlet of said coil outside of the heating zone. Other suitable catalysts which may be used in the hydrogenation coil are compounds of molybdenum, tantalum and magnesium; molybdenum, calcium and cobalt; chromium, molybdenum and cobalt; aluminum, nickel, molybdenum and chromium; preferably oxides of such metals, alone or admixed with material preferably of the iron group and preferably of the heavy metals.

The primary desulfurizing tower was conceived with the idea of forming from a single stream of the initial charging stock two purified clean streams of different molecular weights for subsequent cracking and blending, by maintaining within the said tower a temperature of between 400° and 700° F., sufficient to vaporize the greater portion of lower molecular weight fractions of the initial charge, which may be topped oil, crude oil, liquefied coal, shale oil and hydrocarbon products of semi-refined nature except gasoline and naphtha.

The time of reaction of each stream within the cracking zones will be less than three minutes, and in the cracking zone for the unvaporized oil the time will be less than that of the first named zone. The steam injected through pipes 21 and 41 may be superheated by heat absorption in the tubes 21x of the bridge wall of the furnace 22 or any other suitable means, to the desired degree, preferably at least equal to the temperature of the hydrocarbons at the point of injection of steam, the steam preferably being superheated admixed with one or a compound of materials selected from crude oil, topped crude oil, oil vapors, particularly uncracked vapors, oil gas, natural gas, water gas, etc., in the presence of finely divided iron or hydrides or a mixture of hydrides, e. g. calcium, sodium, zinc, magnesium, aluminum, iron or any other metals such as chromium, nickel, vanadium, tantalum and molybdenum oxides to increase and/or accelerate the formation of nascent hydrogen. Due to the high temperature of the oil and superheated steam vapors as they are commingled, an instantaneous chemical decomposition occurs with the liberation of nascent oxygen and hydrogen. The nascent oxygen of the steam burns the small amount of free carbon to form carbon dioxide and carbon monoxide, and the nascent active hydrogen is added to the hydrocarbons at the division point in the molecules enriching the hydrogen content of the hydrocarbons. In other words, in this process the oil reacts with the steam forming nascent oxygen and hydrogen, the nascent oxygen reacts with the carbon from the oil thereby preventing the formation of coke and the nascent active hydrogen is added to the hydrocarbons at the division point of the molecules at which it cracks.

A heating coil 21x which may be disposed in the bridge wall 22 may be used as a steam superheater or for preheating the charging stock, hydrogeneous gas, air, fixed gas or fuel oil for use in the process.

In Fig. 2, B indicates a burner. At the convection side of the bridge wall 22, the combustion gases first come into contact with the inlet section of coil 6 and the intermediate or roof section of coil 20 and thence pass downward through the tubes of coil 6 disposed intermediate the outlet part of coil 6 and inlet part of coil 20, and finally in contact with the initial or inlet part of coil 20, disposed in the lowest heat zone, the gases discharging through duct D. Within the combustion section of the furnace are located the tubes receiving the highest heat of the cracking coil 6 disposed at one side and at the top of the furnace and at the side of the bridge wall. The flow of the charge to coil 6 is first through a plurality of layers of tubes at the entrance section of the convection side of the bridge wall, and hence at the highest heating zone in the convection section, the flow thence progressing to a bank of tubes adjacent the bridge wall in the combustion section, and thence to a bank of tubes adjacent the furnace wall opposite the bridge wall, thence to a roof bank in the combustion section and thence through the main tube section disposed intermediate the inlet section of coil 6 and the outlet section of coil 6. The flow in cracking coil 20 is through pipe 19 to a series of tubes at the lowermost part of the convection section, thence upward to a series of tubes in the zone of highest heat, comprising a roof bank, and thence through a series of tubes disposed intermediate the outlet section of coil 6 and inlet section of coil 20 which discharges through pipe 23. The cracking coil 6 discharges through pipe 6x.

The size of the blending chamber will vary with the capacity of the apparatus, and for a plant of approximately 1000 barrels may be 6 to 12 feet, in length and from 15 to 30 inches approximately in diameter.

When crude oil is used as a charging stock and previously cracked hydrocarbon vapors discharged into the tank 5 through sprayer 8, the lighter fractions of gasoline type present in the crude charging stock will be released and mixed with the like fractions of the cracked vapors. Cooling will be effected in the tank 5 by means hereinbefore described to condense the heavy fractions and to enable the separation of the different straight run gasoline type fractions and cracked gasoline type fractions. By partly closing valve 48 and opening valve 49 (Fig. 1) said blended straight run and cracked gasoline type fractions, with any entrained fraction of somewhat heavier characteristics will be led through pipe 47 to pipe line 19 and thence to the cracking zone 20 of lower heat jointly with the stream of unvaporized fractions of the charging stock or instead of such stream. In the latter case pipe 50 may be closed and the unvaporized oil withdrawn through pipe 46.

The exact size of furnace, length and diameter of coils, pipes, heights of towers, exact temperature and period of heating, etc., depend on the capacity of the unit plant to be operated, and the character of the charging stock to be processed. Instruments such as thermowells, temperature controllers and recorders, pressure gauges and controllers, safety valves, pumps, etc., are not indicated or mentioned but it is to be understood that they will be used as required, as is well known in the art.

It is to be understood that additional heat may be applied to the primary desulfurizing tower if desired, by any suitable means such as electric heaters, flue gases from furnace duct and the like.

Although the heretofore described method is preferred the system of operation may vary considerably as there are characteristics in structure and apparatus which make my invention one of broad application.

While I have described my invention and methods and apparatus of carrying it into practice, it is to be understood that modification and changes may be made provided they do not depart from the scope of the invention and the following claims covering the invention.

I claim:

1. A process for producing low boiling point hydrocarbons of motor fuel type in which an initial uncracked oil charging stock is substantially vaporized by preheating and then led to a zone where highly heated cracked hydrocarbon products are injected, thereby increasing the degree of vaporization without cracking said charging stock, injecting a cooling material into said zone, and therein causing separation of the mixed hydrocarbon materials into the uncracked and cracked gasoline boiling range fractions, the intermediate fractions condensed from the vapors by said cooling material, and the fractions of the charging stock which are not vaporized in said zone, collecting in a second independent fractionating zone heavy cracked condensate below the gasoline-naphtha range and blending the condensed intermediate fractions with the said heavy cracked condensate of said second zone, cracking said blend under superatmospheric pressure at a cracking temperature of approximately 1000–1100° F., separately cracking said heavy fractions of the charging stock which are not vaporized in said first-named zone, under superatmospheric pressure and a temperature of approximately 800–900° F., blending the cracked products with a portion of unvaporized charging stock, and finally fractionating said blend in said fractionating zone to obtain overhead products of gasoline boiling point range.

2. A process in accordance with claim 1, in which a mixture of the uncracked and cracked gasoline boiling range fractions separated from the oil charging stock and highly heated cracked hydrocarbon products in the zone stated in said claim, are added to the fractions of the charging stock which are not vaporized in said zone, and are reformed during the cracking of said unvaporized fractions of the charging stock to which said gasoline boiling range fractions are added.

3. A process in accordance with claim 1 in which the blended cracked vapors are passed through adsorbent material selected from the group consisting of silica gel, activated charcoal, lime, diatomaceous earth and the like.

4. A process in accordance with claim 1 in which the blended cracked vapors are passed through adsorbent material selected from the group consisting of silica gel, activated charcoal, lime, diatomaceous earth and the like, admixed with metal catalysts of the desulfurizing type.

5. A process in accordance with claim 1, in which the stream of hydrocarbon charging stock heated to a cracking temperature of between 800° and 900° F., is subjected to the action of catalysts of the hydrogenation type.

6. A process in accordance with claim 1, in which hydrogenous gas is passed jointly with the heavy unvaporized fractions of the charging stock into the cracking zone subjected to the lower temperature.

7. A process in accordance with claim 1, in which superheated steam is passed into the cracking zone of higher temperature.

8. A process in accordance with claim 1 in which the uncracked and cracked gasoline boiling range fractions are led to the cracking zone jointly with the unvaporized fractions of the injected cracked hydrocarbon products and the portions of the charging stock unvaporized by said injected cracked hydrocarbon products.

9. A process for producing low boiling point hydrocarbon products of motor fuel type without the production of coke, in which an initial uncracked oil charging stock is subjected to substantial vaporization in a treating zone by directly passing the highly heated cracked products from a cracking operation into contact therewith, passing the unvaporized portion of the charging stock from said treating zone to a heating zone and heating the same to a low cracking temperature, condensing the fractions below gasoline range of said vaporized portion with the like fractions of the hot cracked vapors, passing said condensed heavy coke and tar free fractions thus produced to a higher temperature heating zone and heating the same under pressure to a cracking temperature higher than that applied to said unvaporized portion, blending in a chamber the cracked products of the two heating zones without formation in said chamber of coke, and fractionating the said cracked products in a fractionating zone separate from the zone receiving the initial uncracked charge and the hot cracked vapors, condensing the vapor fractions of said cracked products, and thereby obtaining condensate within the gasoline boiling point range and higher boiling point fractions.

10. A process in accordance with claim 9, in which the cracked and straight run hydrocarbon vapors of gasoline boiling range of the vaporized charging stock and cracked vapors are separated by cooling, and are condensed, and the said condensate in part is passed directly into the vaporized charging stock as a cooling medium to condense the fractions below gasoline range, and in part passed directly into the blended cracked vapors during their fractionation as a cooling medium for separation of the vapors of gasoline boiling range from heavier vapors and to condense said heavier vapors.

11. A process in accordance with claim 9, in which hydrogen is injected with the stream of unvaporized charging stock into the cracking zone under pressure above 25 atmospheres and not to exceed 100 atmospheres and the stream heated by conduction to a temperature of between approximately 800° and 900° F., blending the hydrogenated highly saturated products, under reduced pressure to cause vaporization, with the cracked highly unsaturated products of the other stream cracked under substantially lower pressure and higher temperature than the first named stream but not in excess of 1200° F., to form a high anti-knock motor fuel.

12. In a process of producing liquid low boiling hydrocarbon products, the initial step of subjecting a preheated primary uncracked charging stock of high boiling point to vaporization without cracking predominantly by the sensible heat of highly cracked heated vapors injected into the preheated charging stock, the combined temperature of the injected vapors and the charging stock being sufficient to produce substantial vaporization, between 400° and 700° F., subjecting the commingled vapors to purification and condensation by passing into the vapors a desulfurizing agent selected from the group consisting of lead, ethylene-diamine, ammonia, ammonium sulfide, hydrochloric acid, ammonium chloride, calcium chloride, sodium hydroxide, potassium hydroxide, in solution with material selected from the group consisting of water, alcohol, gasoline, kerosene, and from hydrocarbon materials of lower boiling point than the charging stock, having a temperature lower than the vapors, blending the purified condensate with a purified condensed fraction of higher molecular weight than gasoline and naphtha of previously cracked and fractionated hydrocarbon vapors, heating said blended condensate under superatmospheric pressure to a temperature above the cracking temperature for a period sufficient to secure substantial cracking thereof, heating separately the unvaporized charging stock under substantially less pressure and a lower temperature than that applied to the blended condensate but to a temperature above the cracking temperature for a period sufficient to secure substantial cracking thereof, blending the cracked vapors of the two purified and separately controlled streams, subjecting the blend to desulfurizing material selected from a group consisting of tungsten, molybdenum and iron and their compounds, separating the heavy residue from the blended cracked vapors, and fractionating and condensing the blended cracked vapors.

13. A process for producing liquid low boiling point hydrocarbon products from hydrocarbons of higher boiling point which consists in subjecting a preheated charging stock to substantial vaporization predominantly by the sensible heat of cracked hydrocarbon-steam vapors having a temperature of between 800° and 1200° F., injected into said charging stock, subjecting the commingled vapors to a desulfurizing treatment, separating and condensing part of the purified vapors consisting largely of fractions of lower molecular weight and of the gasoline-naphtha range, refluxing part of said condensate into said commingled vapors to obtain a separate purified condensate consisting largely of fractions of higher molecular weight than the gasoline-naphtha range, blending the said purified condensate of higher molecular weight with heavy purified condensate fractions from previously cracked hydrocarbon vapors, heating under superatmospheric pressure the purified condensate blend above a cracking temperature, between approximately 1000° and 1200° F., and subjecting the same to the action of steam injected into the blend at approximately the point of vaporization mixing a portion of the cracked oil-steam vapors, with the preheated charging stock, mixing the other portion under reduced pressure, with the vapors from a separately controlled stream of charging stock cracked under superatmospheric pressure, at a temperature of between 800° and 900° F., and consisting largely of the unvaporized fractions of the charging stock and the entrained unvaporized fractions of the injected cracked hydrocarbon-steam vapors, contacting the cracked products with a portion of the topped charging stock, separating the residues from the vapors and fractionating and condensing the cracked blended vapors.

14. A process in accordance with claim 13, in which steam is superheated, admixed with hydrocarbon material selected from the group consisting of crude oil, oil vapors, topped oil, gas oil, natural gas, oil gas, admixed with metallic materials selected from hydrides of magnesium, zinc, iron, sodium, aluminum, calcium and from oxides of molybdenum, vanadium, tantalum, nickel, chromium, in finely divided form, to accelerate the formation of nascent hydrogen and the resultant products are added to the blended condensate and unvaporized charging stock preliminary to the heating thereof above their cracking temperatures.

15. In apparatus for converting higher boiling point hydrocarbons into lower boiling point liquid products, a furnace divided into combustion and convection zones, heating means in the combustion zone, independent cracking coils disposed primarily within the convection zone and having their outlets in substantially the same heating section of the kiln, one of said coils largely being in a section of higher heat than the second coil and comprising a plurality of tubes at the highest heating section of the convection zone communicating with a bank of tubes in the combustion zone adjacent a wall which divides it from the convection zone, the latter tubes communicating with a bank of tubes in the combustion zone opposite said division wall, the latter tubes communicating with a roof bank of tubes in the combustion zone, and the roof bank of tubes communicating with a main tubes section disposed intermediate the first-named tubes in the convection zone section of highest heat and the tubes of the second cracking coil, the tubes of the second cracking coil comprising a series of tubes at the section of lowest heat of the convection zone, communicating with a roof bank of tubes in the section of highest heat and thence communicating with a series of tubes disposed between the outlet section of the first-named cracking coil and the said inlet section of the second named cracking coil, a blending chamber receiving the cracked vapors from both coils, a vapor separating tower receiving the vapors from said blending chamber, a fractionating tower receiving the lighter vapors from the vapor separating tower, a desulfurizing tower receiving a charging stock, a conduit for causing a flow of highly heated vapors to said desulfurizing tower whereby the charging stock is substantially vaporized, means for injecting cooling material into the blending chamber, means for injecting cooling material into the vapor separating tower, means for injecting cooling material into the desulfurizing tower, means for injecting sulfur reagent material into the desulfurizing tower, means for injecting sulfur reagent material into the blending chamber, means for injecting steam and hydrogen into the cracking coils, means within the desulfurizing tower for collecting vapor condensate, a flow connection intermediate the last-named means, the bottom of the fractionating tower, and one of said cracking coils, and a flow connection between the desulfurizing tower and the second cracking coil for conveying thereto unvaporized portions of the charging stock.

ERNEST A. OCON.